Jan. 1, 1952 R. V. GANZ 2,581,249
METHOD OF MAKING CERAMIC DIPPING FORMS OR THE LIKE
Filed June 18, 1948 3 Sheets-Sheet 1
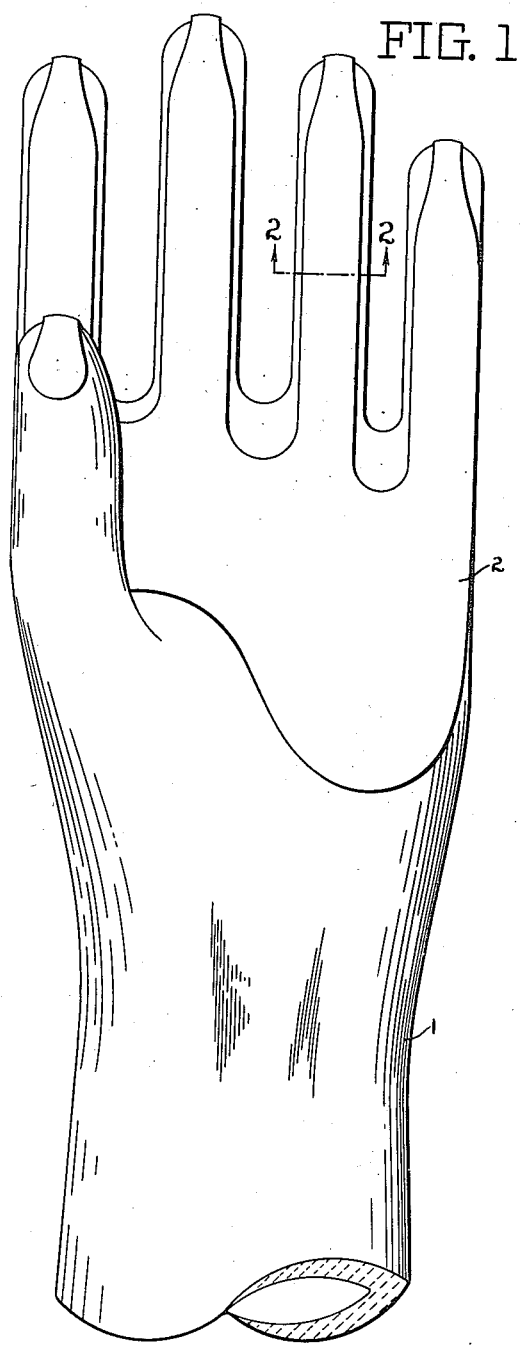
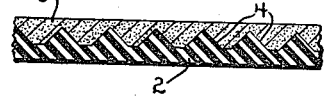
INVENTOR.
Rudolph V. Ganz
BY
Ely & Frye
Attorneys Jan. 1, 1952     R. V. GANZ     2,581,249
METHOD OF MAKING CERAMIC DIPPING FORMS OR THE LIKE
Filed June 18, 1948     3 Sheets-Sheet 2
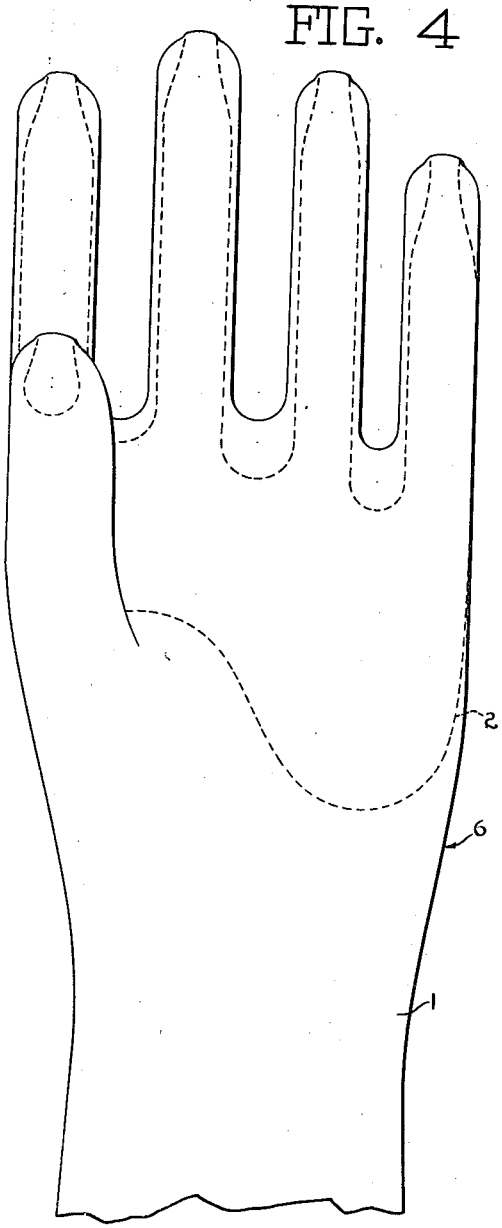
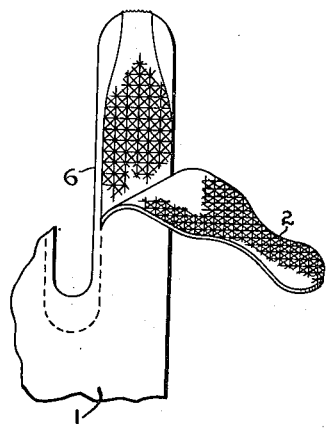
INVENTOR.
Rudolph V. Ganz
BY
Ely & Frye
Attorneys Jan. 1, 1952   R. V. GANZ   2,581,249
METHOD OF MAKING CERAMIC DIPPING FORMS OR THE LIKE
Filed June 18, 1948   3 Sheets-Sheet 3

INVENTOR.
Rudolph V. Ganz
BY
Attorneys

Patented Jan. 1, 1952

2,581,249

UNITED STATES PATENT OFFICE 2,581,249

METHOD OF MAKING CERAMIC DIPPING FORMS OR THE LIKE

Rudolph V. Ganz, Akron, Ohio, assignor to The Colonial Insulator Company, Akron, Ohio, a corporation of Ohio Application June 18, 1948, Serial No. 33,753

5 Claims. (Cl. 25—156)

The present invention relates to the manufacture of ceramic articles having roughened, irregular or decorative surfaces in relief thereon, and while it was primarily developed as a method for making ceramic dipping forms for the manufacture of dipped rubber goods, such as gloves, bathing caps or the like, it is by no means limited to that specific purpose, but may be adapted to the manufacture of a large variety of ceramic wares.

The specific purpose for which the invention was developed was to provide manufacturers of rubber gloves with satisfactory forms for the production of gloves having roughened areas, and the invention is illustrated and will be described with reference to that embodiment. The invention makes it possible for rubber glove manufacturers to produce gloves of the type described at a cost comparable to the cost of making plain or smooth surfaced gloves. The process may also be employed in the manufacture of forms for bathing caps, balloons or other articles of like nature with decorative features in relief thereon.

The present invention is in the nature of an improvement over the subject matter of my previous application Serial No. 23,658, filed April 28, 1948.

The present invention relates to the process of manufacture. It will be understood that while the process and the product are shown and described in great particularity, the details are nonessential and may be varied within the scope of the invention. Articles made by the process are covered in applicant's copending application Serial No. 178,729, filed August 10, 1950, as a division of this application.

The embodiment of the invention which has been selected for illustration shows the process as applied to the making of a ceramic form for the manufacture of rubber gloves by the dipping process.

In the drawings:

Fig. 1 shows a front view of a ceramic glove form to which has been applied the patch which creates the roughened or irregular area over the palm of the form and along the inside of the thumb and fingers. This view illustrates the first step in the process, at which time the form is unbaked.

Fig. 2 is a cross-section on the line 2—2 of Fig. 3.

Fig. 3 is an enlarged section through a portion of the patch before it is applied to the form.

Fig. 4 is a view showing the next step in the process which is the application of the glaze over the unbaked form.

Fig. 5 is the next step in the process at which point the patch is stripped from the unbaked form.

Figure 7:
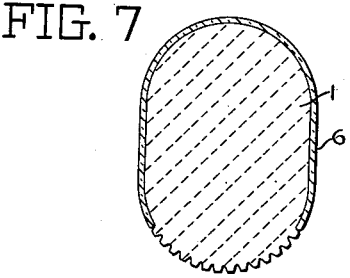
Fig. 7 is a section on the line 7—7 of Fig. 6.

No attempt has been made in the drawings to show exact dimensions, it having been necessary to exaggerate certain features to illustrate the invention.

In the manufacture of dipped rubber goods of which rubber gloves are typical, it is usual to employ a porcelain or ceramic form which is given a baked coating of vitreous glaze or enamel which imparts a smooth, lustrous surface to the goods made thereon. In my prior application to which reference is made above, the invention was primarily directed to the formation of roughened areas on a glazed form. The present invention is for a modification of the basic process by which the finished form is made by a single firing operation.

A glove form is shown at 1, this form being made of clay or other ceramic material. In the condition illustrated in Fig. 1, the form has been shaped and dried, ready for firing. Before the form has completely dried and while there is some moisture in the ceramic material, the next step in the process is carried out, it being preferred that the unbaked form be in this condition so that the roughened formations imposed thereon better amalgamate with the body of the form.

The next step in the process is to prepare the patch or mask which forms the roughened area or relief which is to be incorporated in the finished form. For this purpose use is made of a patch or patches of flexible material, one surface of which is provided with depressed formations such as pockets or recesses of the intended design. It is necessary that the material which is used for the mask or patch be flexible and capable of holding its shape and body during the succeeding steps of the process. The material for the patch may be either porous or non-porous. It is also desirable that the mask or patch be removable without distorting or destroying the deposit which is applied to the form.

For the best results I prefer to use a thin sheet of rubber as the material for the mask as this material satisfactorily meets all of the above requirements and is sufficiently flexible so that it may be shaped and smoothed about the form and is easily stripped or peeled from the deposit made on the form as will be explained.

At least one surface of the sheet is roughened in accordance with the design, in the case of rubber by molding a plurality of pockets or recesses on the face of the sheet which is then cut into patches of the desired size or shape. Such a patch is indicated by the numeral 2 and in the form shown a single sheet or patch is employed for each form which extends over the palm of the glove form and along the thumb and fingers. The configuration of the pockets and recess may be varied and the shape and size of the sheet are determined by the individual manufacturer. The patch may be provided with formations which will also reproduce trade-marks or lettering on the form in addition to the roughened areas.

The recesses in the face of the sheet are indicated by the numeral 4. The patch 2 is placed on a board or other flat surface with the roughened area uppermost and over the patch is spread a thin clay ceramic slip which fills the recesses and is then smoothed off with a spatula, or other flat instrument, level with or slightly higher than the crests of the formations which define the recesses or pockets. Such a deposit is indicated at 5.

The composition of the slip may be the same as the composition of the clay or other material which constitutes the body of the form, although it is preferably thinned down somewhat to permit of easy spreading over the face of the patch. The slip may contain water glass or other adhesive material which will insure that the deposit amalgamates properly with the body of the form.

After the patch is covered with an even deposit of the ceramic slip, it is allowed to dry to the point where the material of the slip has assumed a coherent character. This can be told by observation of the surface of the patch, the ceramic material being dried sufficiently when it has reached a paste-like consistency which is characteristic of partial drying.

The patch is then carefully removed from the board or table on which it is lying, usually by inserting a thin blade between the board and the underside of the patch. The patch is then applied to the surface of the unbaked form and carefully smoothed and shaped over the area which is to have the roughened surface. Such a condition is shown in Fig. 1 and also in section in Fig. 2, the deposit from the patch projecting from the surface of the form as shown in Fig. 2.

It is advisable before applying the patch to coat the surfaces of the form to which the patch is applied with a light coating of a lubricant such as glycerin or the like. This is for the purpose of permitting the patch to be shifted about on the form to position it correctly. Were such an expedient not employed, the porous unbaked form would so quickly absorb the moisture retained in the ceramic slip that it would dry immediately upon contact with the form and the operator would experience difficulty in locating and smoothly applying the patch in its proper position.

The form with the patch applied thereto is now permitted to stand until the deposit beneath the patch has dried to a point where it will retain its shape after the patch is removed. The form with the patch thereon is then dipped in or sprayed with a liquid glazing composition which covers the entire surface of the form. No attempt is made to prevent the glaze from covering the outer surface of the patch. This glaze is of any of the usual glazing compounds which will form the smooth, lustrous outer surface characteristic of porcelain dipping forms. Such a glazed surface is indicated by the numeral 6.

After the glaze has dried to a point where the form may be fired, the patch 2 is removed by peeling it from the form in the manner shown in Fig. 5, which leaves the deposit of slip, formerly held in the recesses of the patch, on the form. It is desirable, of course, to remove the patch without distorting or destroying the configuration which has been imparted to the deposit by the patch. Rubber sheeting such as suggested as the preferred material for the patch is admirably suited for the purpose and the best results are obtained by peeling the patch away from the deposit on a sharp curve as shown in Fig. 5.

As the patch has served as a mask for the deposit, the surface of the clay or other ceramic material which has been deposited thereby retains the sharp outlines and details which were imparted to it by the configuration of the patch.

The form is now ready for the firing operation which bakes the body of the form, the glaze and the deposit placed thereon as a single integral body.

Figure 6:
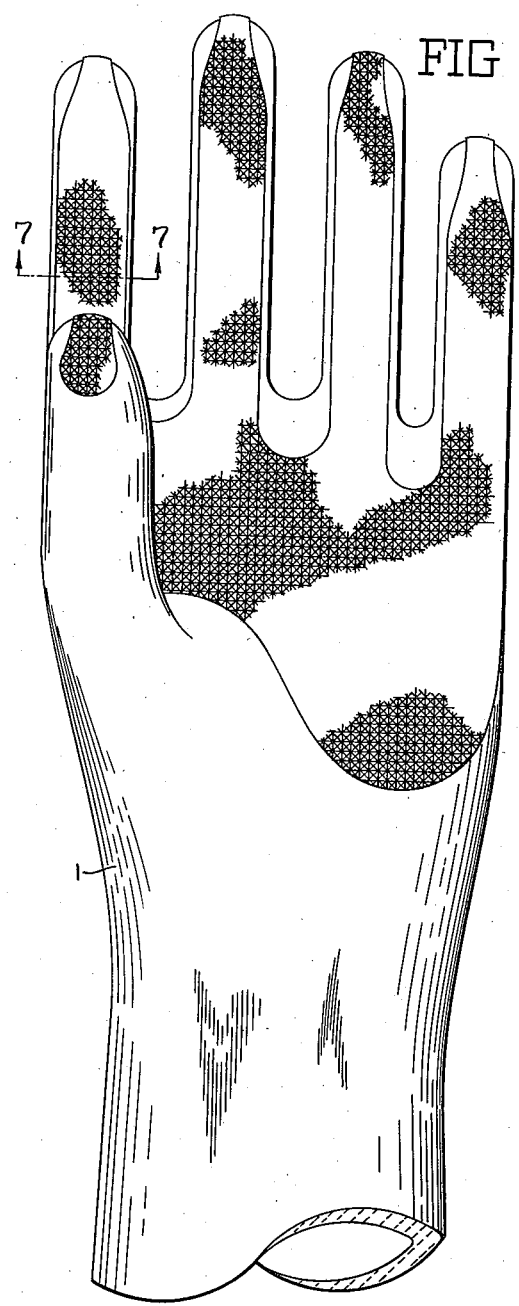
Fig. 6 is a front elevation of the completed form.

The finished form is shown in Fig. 6 and in section in Fig. 7, it being noted that the body of the form, except where the patch was located, is provided with the glaze 6, while the portion of the form which was covered by the patch has the integral, roughened surface of unglazed, baked ceramic material projecting therefrom.

Figure 8:
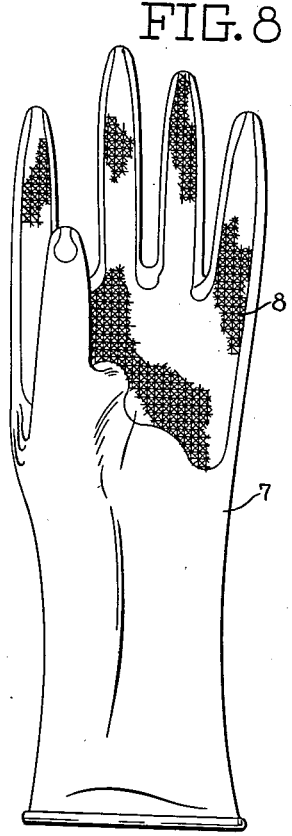
Fig. 8 is a view of a glove which has been made on the form shown in Fig. 6.

A glove made by dipping the form shown in Fig. 6 is illustrated at 7 in Fig. 8, the main body of the glove where it contacted the glazed surface of the form being smooth and having the luster or sheen which is characteristic of dipped goods, while the area 8 which contacted the roughened area of the form has a surface which is a reproduction of the recessed area of the patch 2. It is noteworthy that in dipping a form such as shown in Fig. 6, the rubber will deposit in the irregular surface to a greater depth than over the balance or smooth surface of the form, so that the finished glove actually has a greater thickness over the area 8 than over the balance of the glove. This is a desirable property of a form made in accordance with this invention, for it gives a thickened and reinforced area over those portions of the glove which constitute the gripping surfaces. The finished glove actually gives the impression that the roughened area has been made by the addition of a supplementary layer over the main body of the glove.

As suggested above, the process of this invention is in no way limited to the making of forms for roughened rubber gloves, decorated bathing caps, balloons or rubber goods specifically. It is equally applicable to the manufacture of decorated porcelain or ceramic ware. The slip may be the same color as the body of the form, or it may have different colors if such is desired. In some cases it may be desirable to omit the glazing operation. While it is desirable to remove the sheet 2 from the article before the baking operation in order to use the sheets over again, this is not necessary. Hence unless the sequence of these steps is specifically recited in the attached claims, it will be understood that either step may be performed first. Also, while the sheet is preferably coated with a thin ceramic slip, in some applications of the invention the sheet may be coated with ceramic material by other methods.

What is claimed is:

1. The method of providing a glazed ceramic article with an irregular unglazed surface in relief thereon, comprising forming the body of the article of unbaked ceramic material, providing a sheet of flexible material with recesses in the pattern to be reproduced on the article, coating the surface of the sheet with a thin ceramic slip which fills the recesses, partially drying the slip and applying the sheet to the surface of the unbaked article with the partially dried slip in contact with the surface, coating said article including the area thereof covered by the sheet with a glaze, removing the sheet from the slip deposited on the surface of the article and firing the article.

2. The method of providing a glazed ceramic article with an irregular unglazed surface in relief thereon, comprising forming the body of the article of unbaked ceramic material, providing a sheet of flexible material with recesses in the pattern to be reproduced on the article, filling the recesses with ceramic material, applying the sheet to the surface of the unbaked article with the ceramic material on the sheet in contact with the surface, coating said article with a liquid glaze, removing the sheet from the ceramic material thereon and firing the article.

3. The method of providing a glazed ceramic article with an irregular unglazed area in relief thereon, comprising forming the article of unbaked ceramic material, providing a sheet of flexible material with depressed designs in the pattern to be reproduced on the article, filling said designs with ceramic material, applying the sheet to the article with the ceramic material thereon in contact with the surface of the article, coating the article and the sheet thereon with a glaze and subsequently removing the sheet and baking the article.

4. The method of providing a ceramic article with an irregular surface in relief thereon, comprising forming the article of unbaked ceramic material, providing a flexible sheet with depressed design of the pattern to be reproduced on the article, coating said sheet with a thin ceramic slip which fills said design, partially drying the slip, coating the area of the article which is to carry the design with a lubricant which will prevent rapid drying of the slip, applying the sheet with the partially dried slip in contact with the coated area, shaping the sheet to the surface of the article, and subsequently removing the sheet and firing the article.

5. The method of providing a glazed ceramic article with an irregular unglazed surface in relief thereon, comprising forming the article of unbaked ceramic material, providing a flexible sheet with depressed design of the pattern to be reproduced on the article, coating said sheet with a thin ceramic slip which fills said design, partially drying the slip, coating the area of the article which is to carry the design with a lubricant which will prevent rapid drying of the slip, applying the sheet with the partially dried slip in contact with the coated area, shaping the sheet to the surface of the article, coating the article with a glaze and subsequently removing the sheet and firing the article.

RUDOLPH V. GANZ.

REFERENCES CITED

The following references are of record in the file of this patent:

UNITED STATES PATENTS

| Number | Name | Date |
| --- | --- | --- |
| 207,543 | Niedringhause | June 1, 1878 |
| 264,505 | Anderson | Sept. 19, 1882 |
| 493,449 | Schmalz | Mar. 14, 1893 |
| 2,174,198 | Schramm | Sept. 26, 1939 |
| 2,209,624 | Jeffery | July 30, 1940 |
| 2,261,583 | Hemphill | Nov. 4, 1941 |
| 2,334,307 | Bauer | Nov. 16, 1943 |
| 2,344,960 | Beal | Mar. 28, 1944 |
| 2,384,741 | Hemphill | Sept. 11, 1945 |
| 2,512,929 | Galbraith et al. | June 27, 1950 |